(12) United States Patent
Kelley

(10) Patent No.: US 9,145,187 B2
(45) Date of Patent: Sep. 29, 2015

(54) PEDAL POSITIONER AND METHOD

(76) Inventor: Ryan Kelley, Frisco, TX (US)

( * ) Notice: Subject to any disclaimer, the term of this patent is extended or adjusted under 35 U.S.C. 154(b) by 946 days.

(21) Appl. No.: 13/199,013

(22) Filed: Aug. 17, 2011

(65) Prior Publication Data

US 2013/0042720 A1 Feb. 21, 2013

(51) Int. Cl.
*B62M 3/16* (2006.01)

(52) U.S. Cl.
CPC ............. *B62M 3/16* (2013.01); *Y10T 29/49817* (2015.01); *Y10T 74/2168* (2015.01)

(58) Field of Classification Search
CPC ........ B62M 3/08; B62M 3/083; B62M 3/086; B62M 3/10
USPC ................................... 74/594.1, 594.4, 594.5
See application file for complete search history.

(56) References Cited

U.S. PATENT DOCUMENTS

| | | | |
|---|---|---|---|
| 516,996 A * | 3/1894 | Baenziger | 74/594.6 |
| 614,856 A * | 11/1898 | Gerow | 74/594.5 |
| 654,245 A | 7/1900 | Glasser | |
| 1,230,129 A | 6/1917 | D'Artoys et al. | |
| 1,393,256 A | 10/1921 | Wright | |
| 1,834,296 A | 12/1931 | Talke et al. | |
| 3,009,348 A | 11/1961 | Colbert et al. | |
| 3,788,163 A | 1/1974 | Gause et al. | |
| 4,103,563 A | 8/1978 | Genzling | |
| 4,815,333 A | 3/1989 | Sampson | |
| 5,078,026 A | 1/1992 | Giffin | |
| 5,203,827 A | 4/1993 | Nestrud | |
| 6,237,929 B1 | 5/2001 | Kielland | |
| 2009/0308195 A1 | 12/2009 | Appleman | |

FOREIGN PATENT DOCUMENTS

DE 9708 1/1988

* cited by examiner

*Primary Examiner* — Thomas Diaz
(74) *Attorney, Agent, or Firm* — Schultz & Associates, P.C.

(57) ABSTRACT

A removable pedal positioner to engage a crank arm and a pedal of a bicycle to position the pedal in a generally horizontal position. One embodiment comprises a bridge, at least one prong, and a mounting post. The mounting post engages the crank arm while the at least one prong extends past the crank arm to position the pedal in a generally horizontal position. In other embodiments, the positioner utilizes a flexible clamp to secure the positioner to the crank arm thereby positioning the pedal in a generally horizontal position.

3 Claims, 11 Drawing Sheets

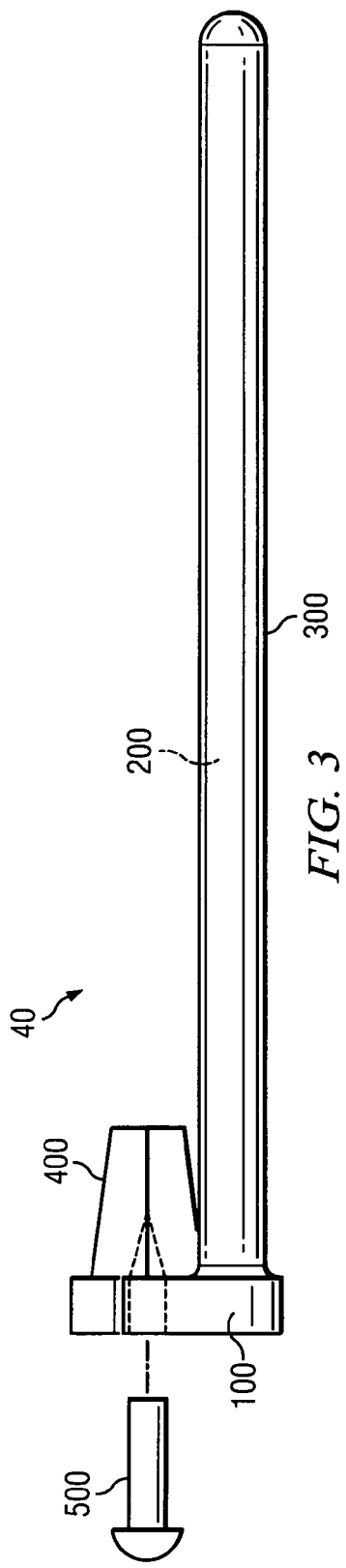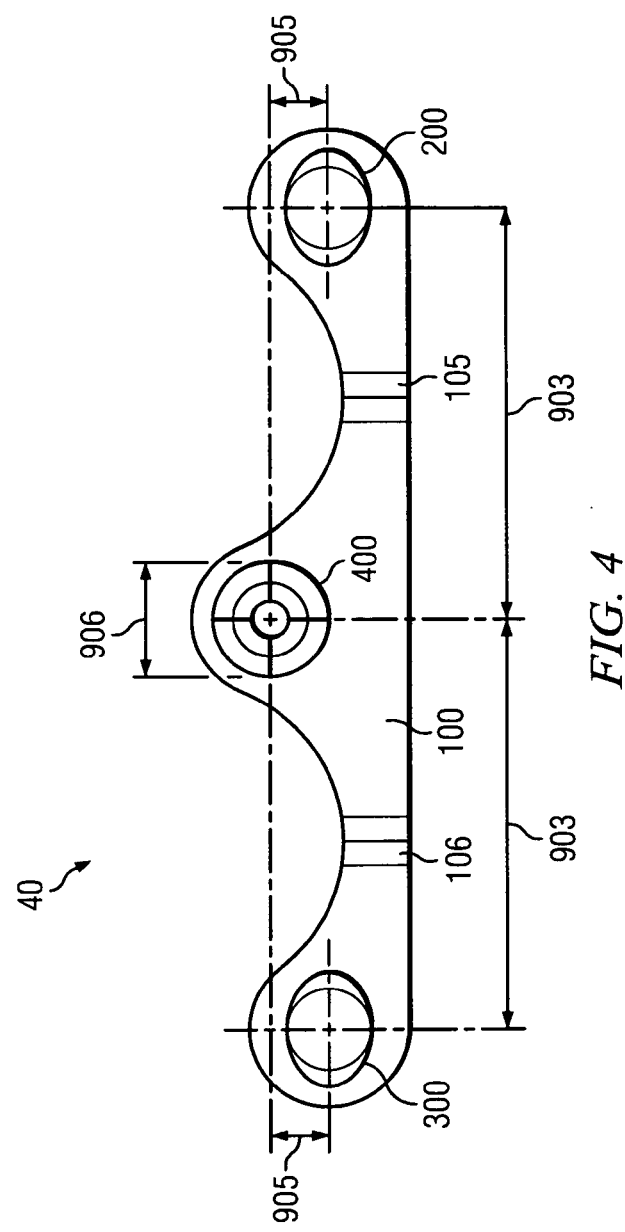

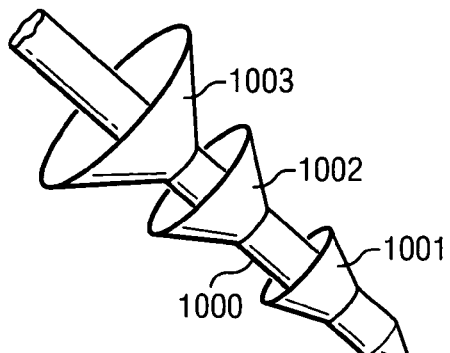
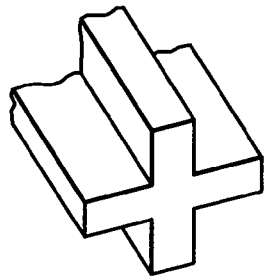
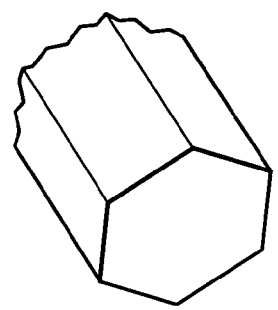
*FIG. 14A*     *FIG. 14B*     *FIG. 14C*
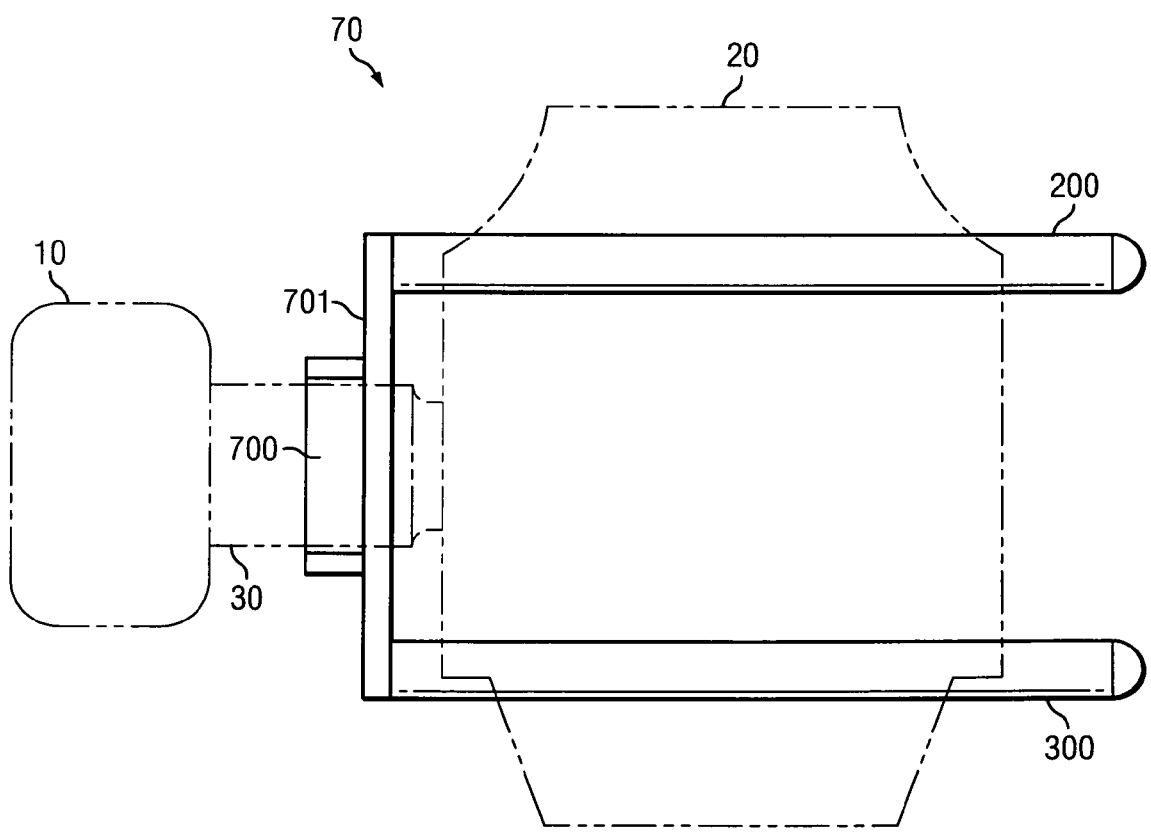
*FIG. 15*

PEDAL POSITIONER AND METHOD

TECHNICAL FIELD OF THE INVENTION

This disclosure relates to apparatus for positioning pedals. More specifically, this disclosure relates to a removable pedal positioner for use in conjunction with bicycle pedals.

BACKGROUND OF THE INVENTION

In the prior art, various devices have been designed and produced for balancing the position of a bicycle pedal. However, many suffer from significant problems requiring the use of either counterweights or additional attachments to the bicycle pedal or the bicycle crank arm to position the pedal. In one typical prior art approach, counterweights are attached to the pedal to balance the pedal in a horizontal position. In another prior art approach, devices are attached to either the crank arm or the pedal to orient the pedal in a horizontal position. Both of these approaches add to the overall weight of the bicycle, thereby adding to the overall weight that a user has to propel, requiring the use of greater muscular force. When used in a racing context, use of these prior art approaches ultimately results in a decreased performance. Further, all of the prior art approaches must remain on the bicycle when in use and are not removable.

For example, U.S. Pat. No. 1,230,129 to D'Artoys, et al., discloses an adjustable vertical balancing device for the pedals of bicycles with or without toe clips, the purpose of which is to maintain as far as possible the pedals in a horizontal position. A plate is secured to the rear bar of the pedal with bolts. The plate is bent at a right angle where a first part is attached to the pedal, and a second part has lead weights affixed to it. This device requires adding weights, increases the overall bicycle weight, and must remain attached when in use.

U.S. Pat. No. 1,393,256 to Wright discloses a means for automatically adjusting the pedals of a bicycle in the proper position to receive the feet of a rider mounting the machine. Unequal weights are clipped to the underside of both pedals so that one pedal is always purposefully at the lowest point in the rotation of the crank. This device requires adding weight to the bicycle. Further, a user must dismount and manually detach the weights.

U.S. Pat. No. 1,834,296 to Talke, et al., discloses an attachment for cycle pedals for the purpose of maintaining the pedals in a horizontal position, as well as for distributing the wear and tear uniformly between both faces of the pedal tread. A spiral spring-clamp attaches a weight under the axle sleeve of the pedal. This device requires adding weights to position a pedal and must remain on the pedal when in use.

U.S. Pat. No. 4,103,563 to Genzling discloses a method and structure for orienting a bicycle pedal. A magnet attached to the pedal is attracted to a magnet mounted on the crank arm. The pedal is automatically oriented in a substantially horizontal position at least when the rotary crank has turned through 90° beyond its top dead center position. This device requires the use of magnets to position a pedal and must remain on the bicycle when in use.

U.S. Pat. No. 5,078,026 to Giffin discloses a bicycle pedal orientation device, which can be integrally formed with the pedal itself or removably attached to the pedal with bolts. The orientation device includes a cam comprised of a release lever and a latch arm. The latch arm includes a pawl, which releasably engages detents in the engaging mechanism. When engaged, the pedal is oriented in a horizontal position. Applying pressure to the lever by the foot of a rider causes the latch arm to disengage, and thus the pedal is free to rotate as usual throughout the duration of the bicycle use. This device must be either bolted to a pedal or built into the pedal when manufactured. This device remains on the pedal when in use.

U.S. Pat. No. 5,203,827 to Nestrud discloses a counterweighted pedal. A counterweighting body is attached to the underside of the pedal through the use of clamps. The counterweighting body orients the pedal in a preferred horizontal position. This device requires a special pedal, relies on adding weights, and must remain on the pedal when in use.

The prior art fails to disclose or suggest a removable device for positioning a pedal. Therefore, it is desirable to have a device for positioning a pedal that is removable and does not add to the overall weight of the bicycle when in use.

SUMMARY OF THE INVENTION

The inventor hereby discloses a removable attachment for a bicycle pedal that angularly positions the pedal with respect to a crank arm.

One embodiment comprises a bridge, at least one prong attached to the bridge, a mounting post attached to the bridge, and a pin. This embodiment engages a crank arm and the pedal attached to the crank arm with the mounting post inserting into a hole in a fastener, which fastens the pedal to the crank arm. The pin may be inserted into the mounting post, expanding the mounting post to secure the mounting post in the hole in the fastener. The prong extends past the crank arm to position the pedal in a generally horizontal position. The mounting post in one embodiment has a multifurcated generally frustoconical shape and is adapted to receive the pin.

In another embodiment, the mounting post is shaped to generally match a hole in a fastener. In this embodiment, the mounting post frictionally engages the hole in the fastener to mount the positioner without the pin. When in use, the positioner disengages the hole in the fastener and falls from the crank arm.

In another embodiment, the positioner comprises a first flexible clamp, a second flexible clamp, a first prong, a second prong, a first extension, and a second extension. In this embodiment, the clamps surround the crank arm of the bicycle. The first and second prongs extend out from the first and second extensions in a direction generally parallel to the pedal axis to support the pedal in a generally horizontal position. First and second extensions extend generally vertically from the first flexible clamp and attach to the second flexible clamp.

In another embodiment, the positioner comprises a flexible clamp, a prong bridge, a first prong, and a second prong. In this embodiment, the flexible clamp surrounds a bushing connecting the pedal to the crank arm. The prong bridge is attached to the flexible clamp and the first and second prongs extend out from the prong bridge in a direction generally parallel to the pedal axis to support the pedal in a generally horizontal position.

Each of the aforementioned embodiments can be modified to comprise a range of prongs, from a single prong to a plurality of prongs.

Each of the aforementioned embodiments can incorporate a prong constructed to fracture when in use to achieve a disposable solution to incorrect pedal positioning.

Each of the aforementioned embodiments can be constructed to detach from the pedal to achieve a reusable solution to incorrect pedal positioning.

BRIEF DESCRIPTION OF THE DRAWINGS

The disclosed embodiments will be described with reference to the accompanying drawings. Like pieces in different drawings carry the same number.

FIG. 3 is a side view of a preferred embodiment.
FIG. 4 is an end view of a preferred embodiment.
FIGS. 14A, 14B, and 14C are perspective views of various mounting post embodiments.
FIG. 15 is a top view of a preferred embodiment engaged with a bushing and a pedal.

DETAILED DESCRIPTION

Figure 1:
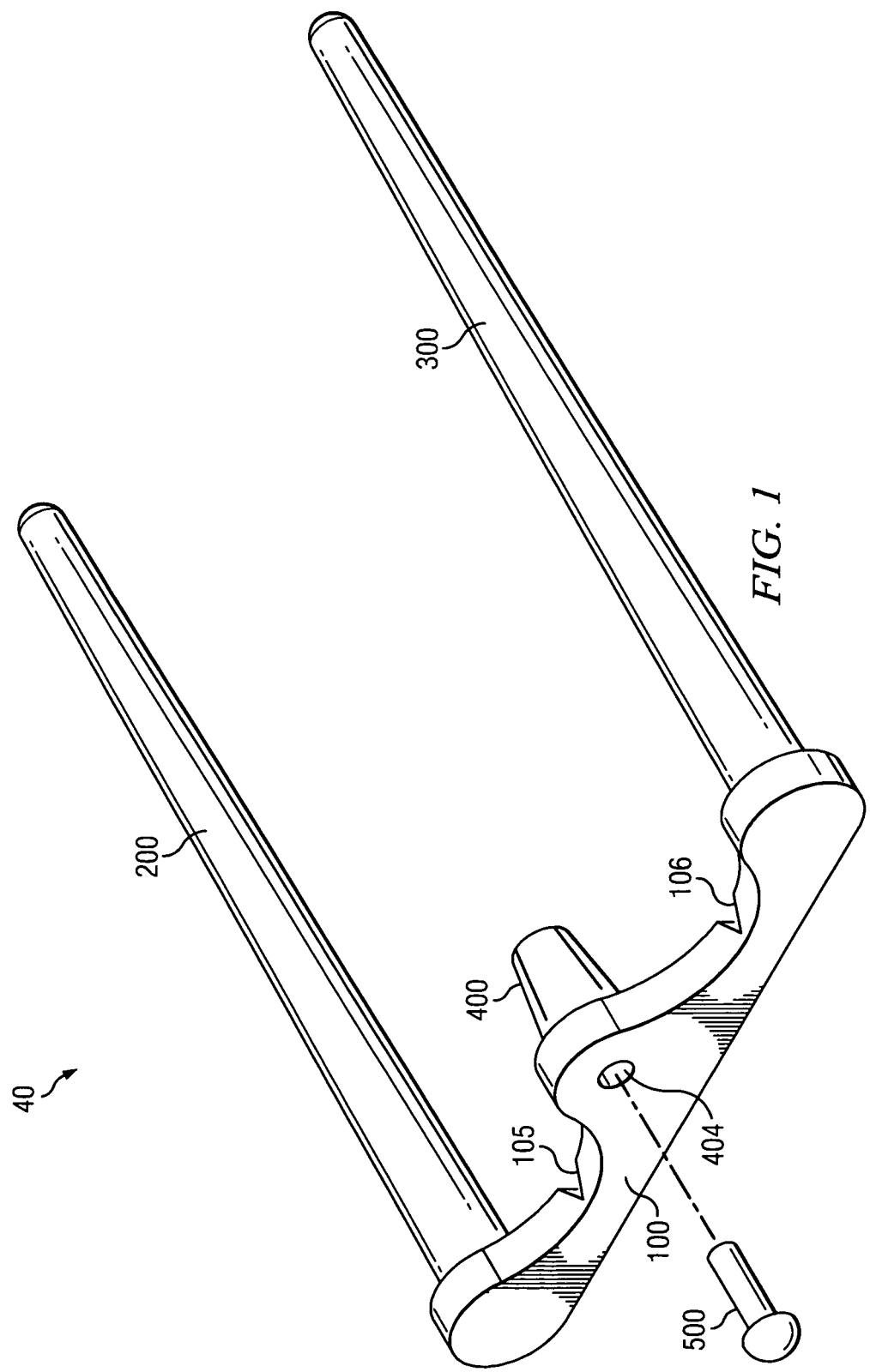
FIG. 1 is a perspective view of a preferred embodiment.

Referring to FIG. 1, bridge 100 is connected to prong 200 and prong 300 and mounting post 400. Prong 200 and prong 300 both extend generally perpendicularly from bridge 100. Mounting post 400 extends generally perpendicularly from bridge 100. Pin 500 is inserted into hole 404.

Figure 2:
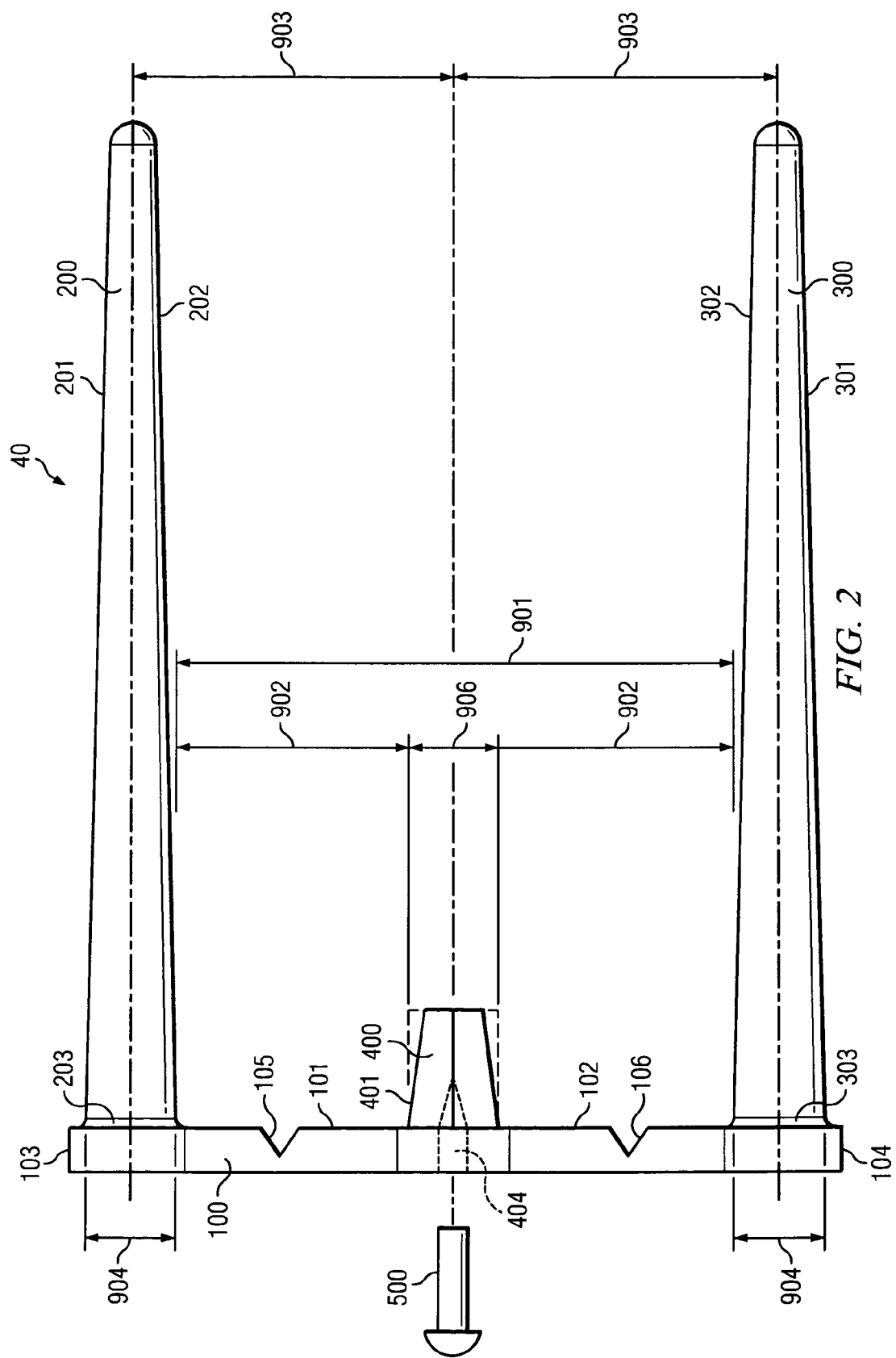
FIG. 2 is a top view of a preferred embodiment.

In FIG. 2, prong 200 has outside surface 201, inside surface 202, and base 203. Prong 300 has outside surface 301, inside surface 302, and base 303. Bridge 100 has inside surface 101, which separates prong 200 and mounting post 400. Bridge 100 has inside surface 102, which separates prong 300 and mounting post 400. Bridge 100 has first end 103 and second end 104, notch 105, and notch 106. Mounting post 400 has outside surface 401.

Mounting post 400 has width 906 that is sufficient to insert into a hole in a fastener in a crank arm. Mounting post 400 has a generally frustoconical shape, has hole 404, which is adapted to receive pin 500. Inside surface 202 of prong 200 and inside surface 302 of prong 300 are separated by distance 901, which is greater than the width of a crank arm. Inside surface 202 of prong 200 and mounting post 400 are separated by distance 902. Mounting post 400 and inside surface 302 of prong 300 are separated by distance 902. Distance 902 is approximately equal on either side of mounting post 400 to position mounting post 400 centrally between prong 200 and prong 300. The central axis of prong 200 and the central axis of mounting post 400 are separated by distance 903. The central axis of mounting post 400 and the central axis of prong 300 are also separated by distance 903. Distance 903 is approximately equal between prong 200 and mounting post 400 and between prong 300 and mounting post 400 to position centrally mounting post 400 between prong 200 and prong 300.

In one embodiment, bases 203 and 303 are constructed to each have width 904 that is sufficient to allow prongs 200 and 300 in conjunction with notch 105 and notch 106 to be broken when in use. In this embodiment, pin 500 is inserted into hole 404 to expand generally frustoconical mounting post 400 to secure positioner 40 to a hole in a fastener.

In FIG. 3, positioner 40 comprises bridge 100, prongs 200 and 300, mounting post 400, and pin 500.

Referring to FIG. 4, bridge 100 is connected to prong 200, prong 300, and mounting post 400. Mounting post 400 has width 906. Width 906 is sufficient to engage with a hole in a fastener in a crank arm. The central axes of prong 300 and prong 200 are each at approximately equal distance 903 from the central axis of mounting post 400, thereby centrally positioning mounting post 400 between prong 200 and prong 300. The central axis of mounting post 400 is at vertical distance 905 from the central axis of prong 300 and prong 200. Distance 905 allows prong 200 and prong 300 to position a pedal while mounting post 400 is engaged with a hole in a fastener.

Figure 5A:
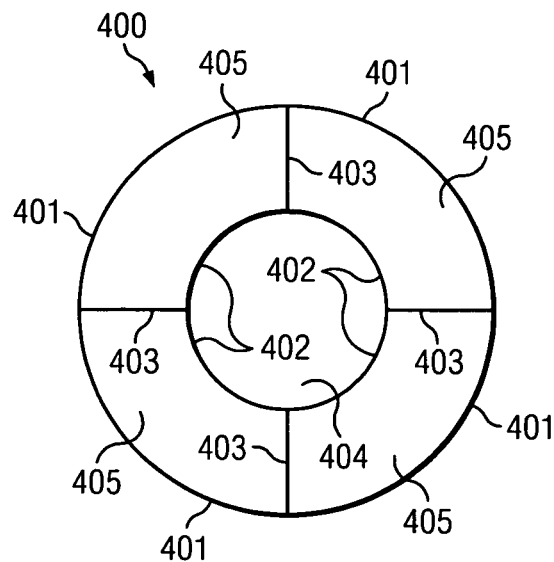
FIG. 5A is an end view of a mounting post.

Referring to FIG. 5A, mounting post 400 has a generally frustoconical shape and is divided into multifurcated sections 405. Mounting post 400 has outside surface 401, inside surface 402, and a plurality of spaces 403. Inside surface 402 forms hole 404. Spaces 403 allow mounting post 400 to be expanded when pin 500 is inserted into hole 404.

Figure 5B:
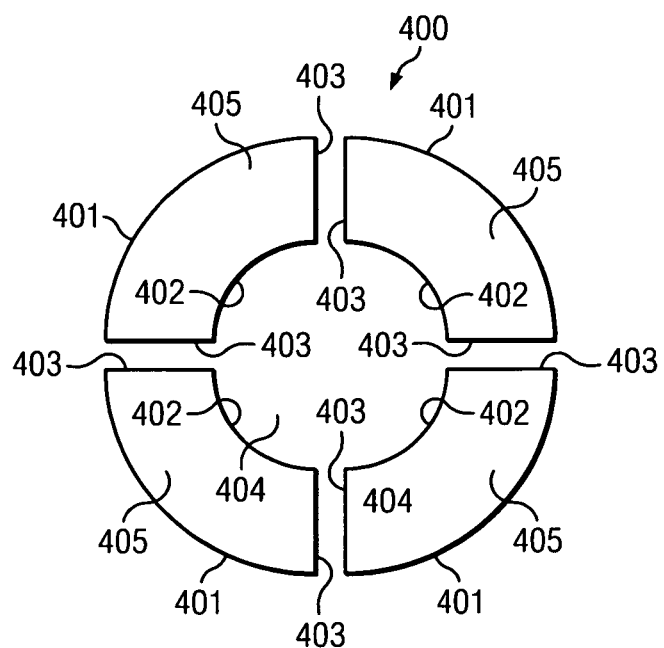
FIG. 5B is an end view of an expanded mounting post.

Referring to FIG. 5B, mounting post 400 is expanded from pin 500 being inserted into hole 404. Pin 500 forces multifurcated sections 405 of mounting post 400 to expand by pushing against inside surface 402 of mounting post 400. Spaces 403 are expanded and engage a hole of a fastener via outside surface 401.

Figure 6:
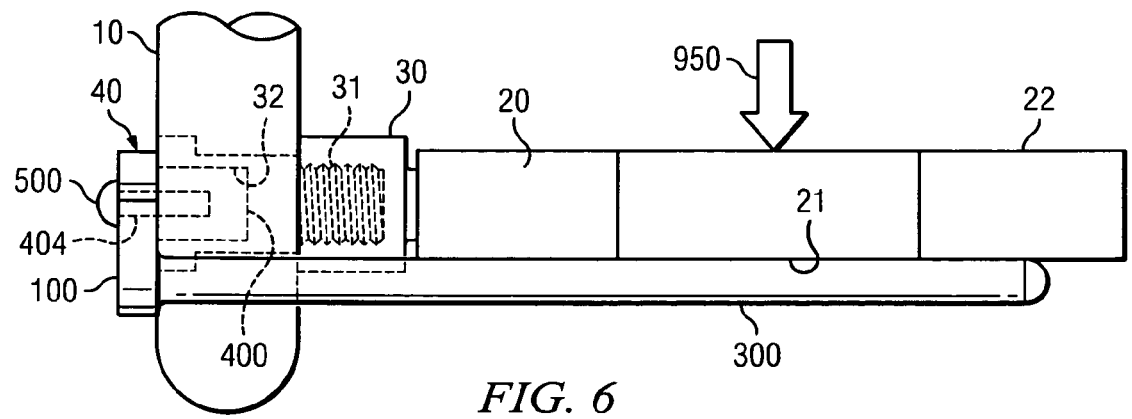
FIG. 6 is a side view of a preferred embodiment engaged with a crank arm and a pedal.

Referring to FIG. 6, positioner 40 is engaged with crank arm 10 and pedal 20. Pedal 20 includes bottom surface 21 and top surface 22. Pedal 20 is connected to crank arm 10 with bushing 30. Bushing 30 includes fastener 31, which fastens bushing 30 to crank arm 10. Fastener 31 includes hole 32. Mounting post 400 is inserted into hole 32. Pin 500 is inserted into hole 404 in mounting post 400 expanding mounting post 400 to secure positioner 40 in hole 32. Prong 200 and prong 300 extend past crank arm 10 to support pedal 20 at its bottom surface 21 to position pedal 20 in a generally horizontal position.

Figure 7:
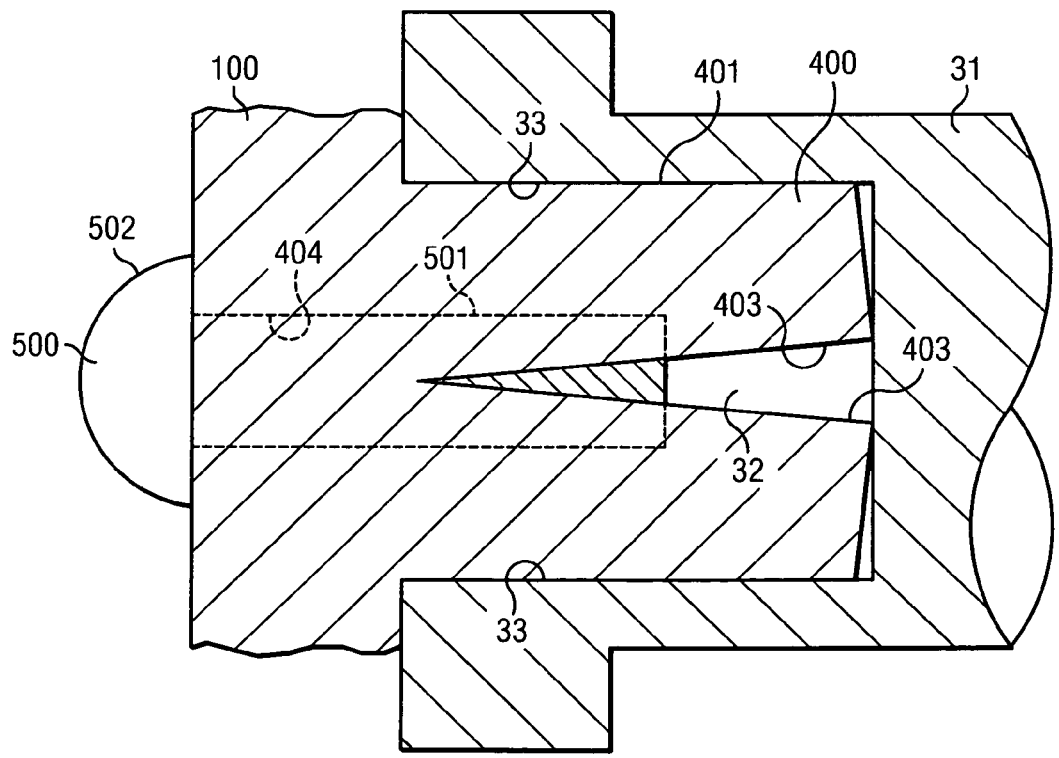
FIG. 7 is a partial section view of a pin engaged with a mounting post in a hole in a fastener.

Referring to FIG. 7, pin 500 has shaft 501 and flange 502. Mounting post 400 is connected to bridge 100. Fastener 31 includes hole 32, having side surface 33. Mounting post 400 is inserted into hole 32. Shaft 501 of pin 500 is inserted into hole 404 of mounting post 400, through bridge 100, to expand spaces 403, forcing outside surface 401 of mounting post 400 to frictionally engage side 33 of hole 32. When engaged, flange 502 is flush with bridge 100.

Referring to FIGS. 14A, 14B, and 14C, mounting post 400 in various alternate embodiments is shaped to generally match different holes in different fasteners. These shapes can include, but are not limited to, fasteners accepting a driver having a Phillips head, as shown in FIG. 14B, or a hexagonal head, as shown in FIG. 14C, or a spanner head. Alternatively, a universal insert post 1000 may also be employed to adapt to various hole diameters and cross-sectional shapes. In this embodiment, insert post 1000 includes flexible frustoconical shrouds 1001, 1002 and 1003 of gradiated diameter. The shrouds plastically deform and frictionally engage the interior surface of holes of varying shape and diameter, thereby adapting easily.

Figure 8:
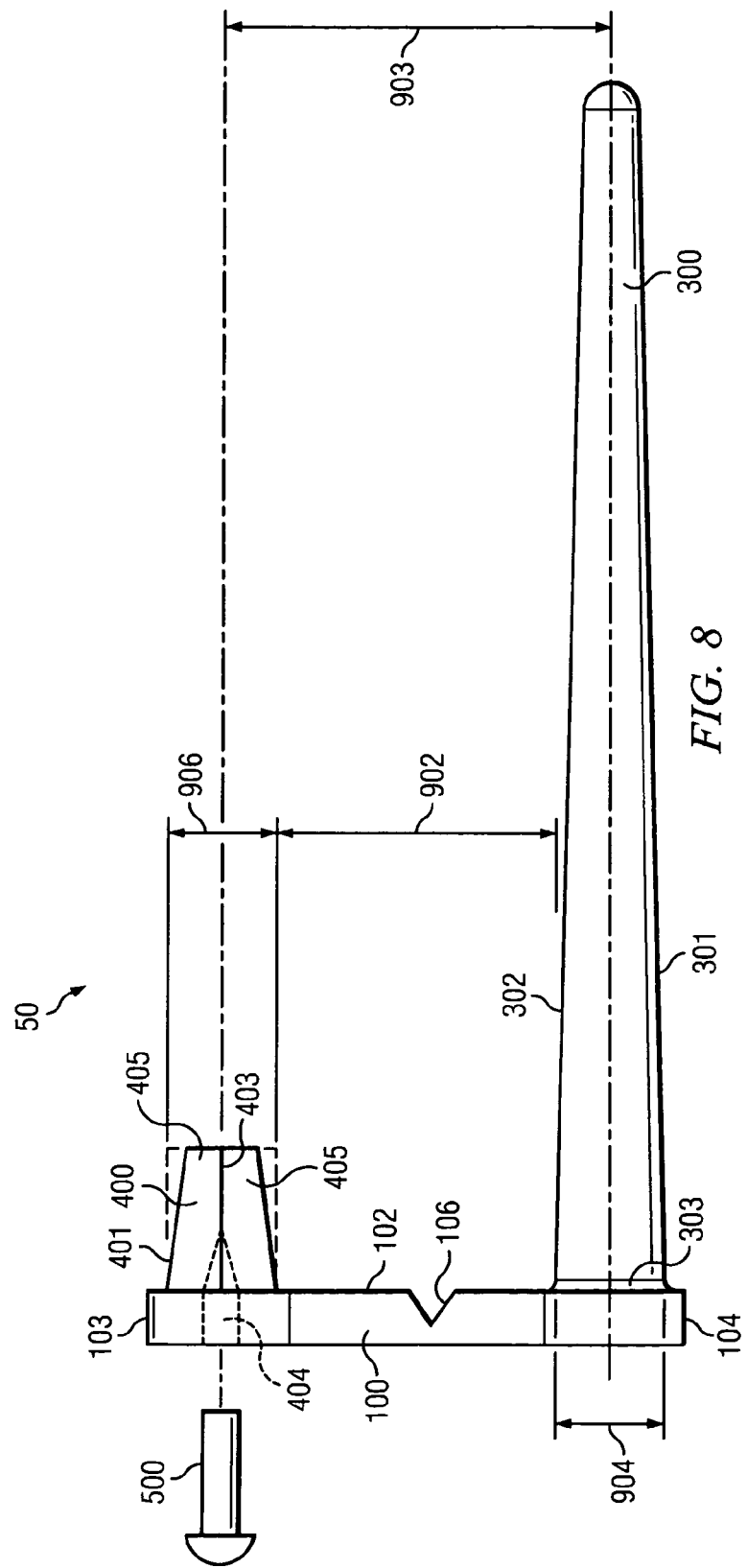
FIG. 8 is a top view of a preferred embodiment.

Referring to FIG. 8, positioner 50 comprises bridge 100 connected to prong 300 and connected to mounting post 400. Prong 300 has outside surface 301, inside surface 302, and base 303. Mounting post 400 has outside surface 401 and hole 404. Bridge 100 has inside surface 102, first end 103, second end 104, and notch 106. Distance 902 between outside surface 401 of mounting post 400 and inside surface 302 of prong 300 positions prong 300 to orient a pedal while mounting post 400 is inserted into a hole in a fastener in a crank arm. Mounting post 400 has width 906 which is sufficient to be inserted into a hole in a fastener. Base 303 has width 904. The central axis of mounting post 400 and the central axis of prong 300 are separated by distance 903 to allow mounting post 400 to be inserted into a hole in a fastener in a crank arm to allow prong 300 to extend past the crank arm to position a pedal. Pin 500 is inserted into hole 404 in mounting post 400 to secure positioner 50.

Figure 9:
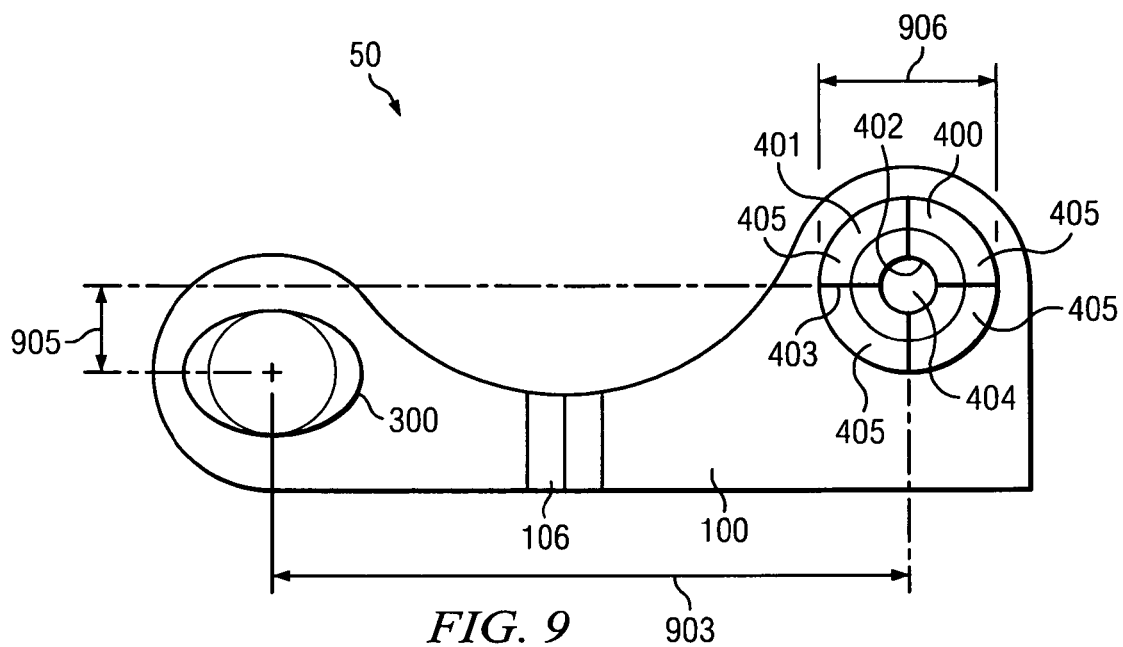
FIG. 9 is an end view of a preferred embodiment.

Referring to FIG. 9, bridge 100 is connected to prong 300 and to mounting post 400. The central axis of prong 300 and the central axis of mounting post 400 are separated by distance 903, which is sufficient to allow mounting post 400 to be inserted into a hole of a fastener in a crank arm while concurrently allowing prong 300 to extend past the crank arm to position a pedal in a generally horizontal position. Mounting post 400 has width 906 that is sufficient to allow mounting post 400 to be inserted into a hole of a fastener in crank arm. The central axis of mounting post 400 and the central axis of prong 300 are separated by distance 905 to allow mounting post 400 and prong 300 to simultaneously respectively engage a hole in a fastener and a pedal.

Referring to FIGS. 8 and 9, in one embodiment, mounting post 400 has a generally frustoconical shape and is divided into multifurcated sections 405. In this embodiment, pin 500 is used to secure the positioner in a hole of a fastener. In this embodiment, base 303 has width 904 that is sufficient to allow prong 300 to be broken when in use. In this embodiment, bridge 100 has notch 106 to facilitate the severance of prong 300 from bridge 100.

Figure 10:
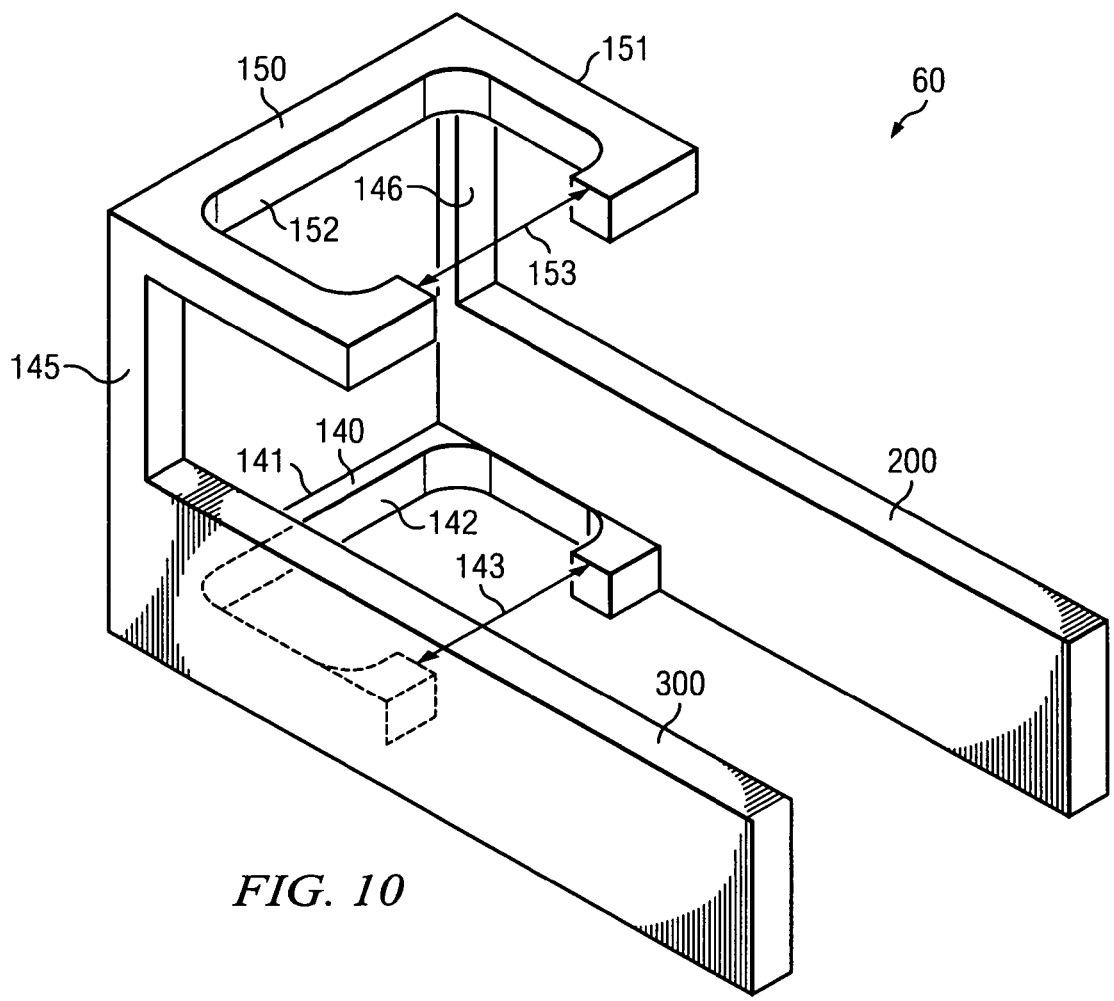
FIG. 10 is a perspective view of a preferred embodiment.

Referring to FIG. 10, positioner 60 comprises flexible clamp 140, extension 145, extension 146, flexible clamp 150, prong 200, and prong 300. Extensions 145 and 146 are attached to clamp 140, extend from clamp 140 in a generally vertical direction, and are attached to flexible clamp 150. Prong 200 extends in a generally horizontal direction from extension 146. Prong 300 extends in a generally horizontal direction from extension 145. Flexible clamp 140 has outside surface 141, inside surface 142, and space 143. Flexible clamp 150 has outside surface 151 and inside surface 152, and space 153. Inside surface 152 is sufficient to surround a crank arm and to frictionally position clamp 150 on a crank arm. Likewise, inside surface 142 is sufficient to surround a crank arm and to frictionally position flexible clamp 140 on a crank arm.

Figure 11:
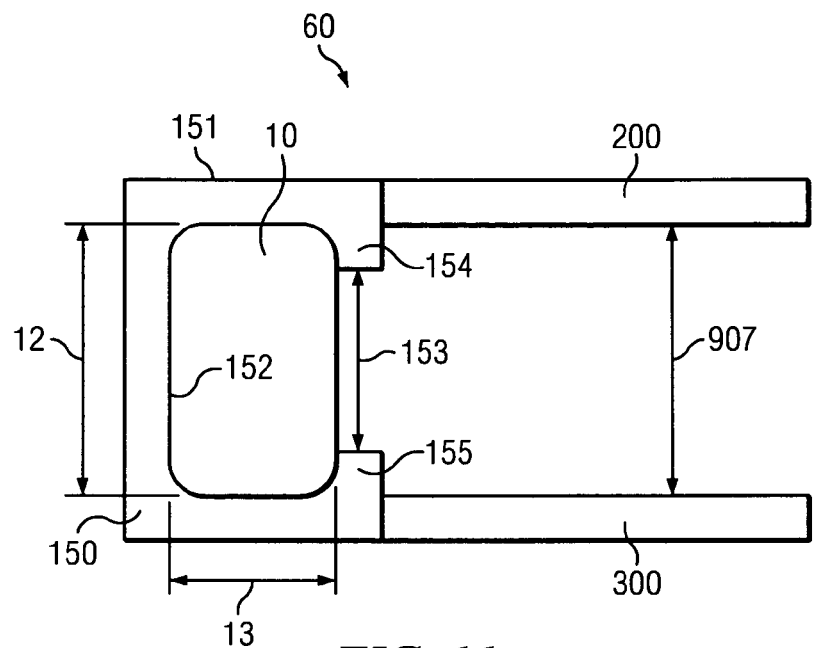
FIG. 11 is a top view of a preferred embodiment.

Referring to FIG. 11, crank arm 10 has width 12 and thickness 13. Inside surface 152 surrounds crank arm 10 to frictionally position clamp 150 on crank arm 10. Prongs 200 and 300 extend to position a pedal. Prongs 200 and 300 are separated by distance 907, which is sufficient to enable prong 200 and prong 300 to engage a pedal.

Figure 12A:
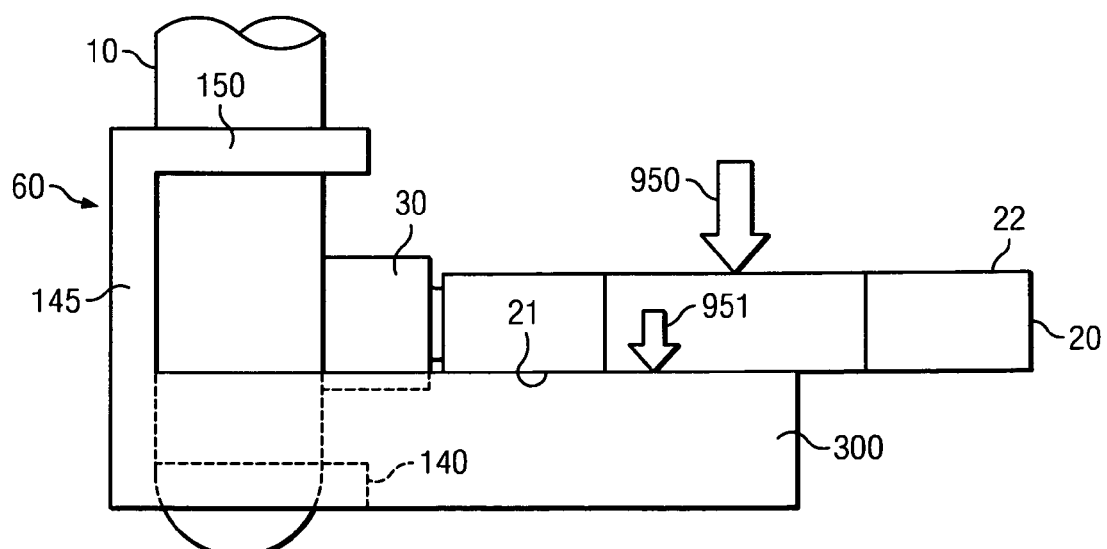
FIG. 12A is a side view of a preferred embodiment engaged with a crank arm and a pedal.
Figure 12B:
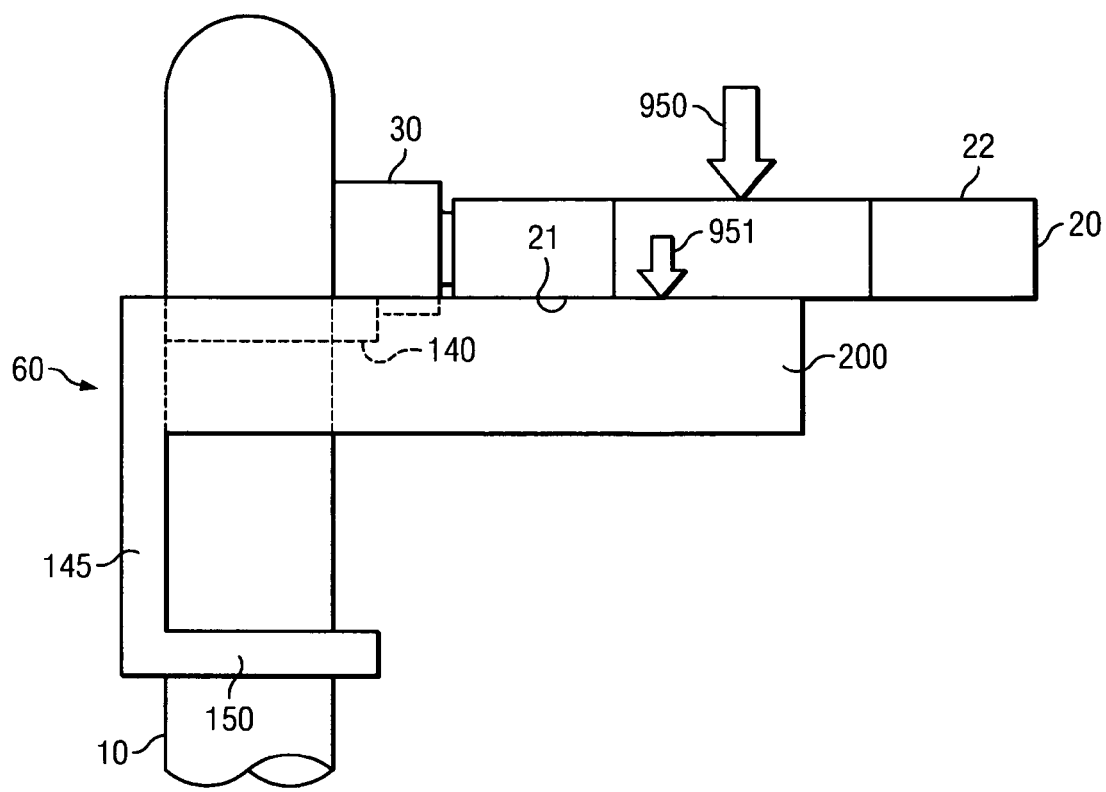
FIG. 12B is a side view of a preferred embodiment engaged with a crank arm and a pedal.

Referring to FIGS. 12A and 12B, positioner 60 is engaged with crank arm 10 and positioning pedal 20 in a generally horizontal position. FIG. 12A depicts the pedal at a bottom dead center position. FIG. 12B depicts the pedal at a top dead center position. Pedal 20 has top surface 22 and bottom surface 21. Flexible clamp 140 and flexible clamp 150 are frictionally positioned on crank arm 10, separated by extension 145, allowing prong 200 and prong 300 to extend in a generally horizontal direction to locate pedal 20 in a generally horizontal position. In use, force 950 is applied to top surface 22 of pedal 20, and force 951 is applied to prongs 200 and 300.

Flexible clamps 140 and 150 are constructed of a material which allows plastic deformation. Flexible clamps 140 and 150 are flexibly deformed to be positioned on crank arm 10. Upon returning to original shape, flexible clamp 140 and flexible clamp 150 releasably grip crank arm 10. Those skilled in the art will appreciate that flexible clamp 140 and flexible clamp 150 can assume a multitude of shapes to suitably grip crank arm 10. Those skilled in the art will appreciate that prongs 200 and 300 can be positioned to extend from a multitude of locations between flexible clamps 140 and 150 on extensions 145 and 146.

Figure 16A:
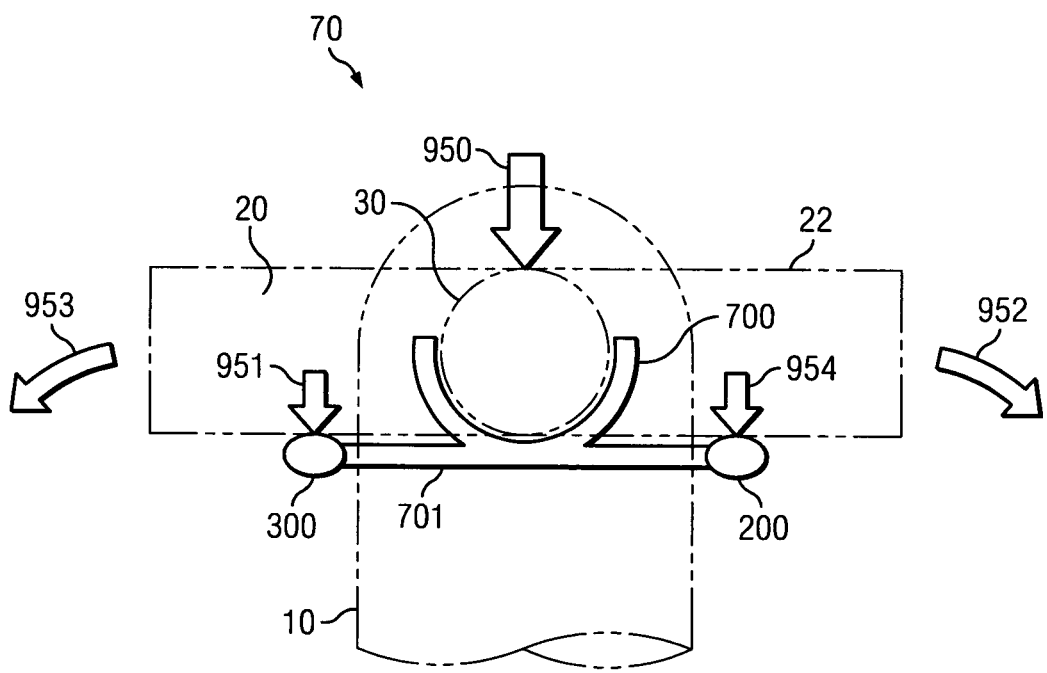
FIG. 16A is an end view of a preferred embodiment engaged with a bushing and a pedal.
Figure 16B:
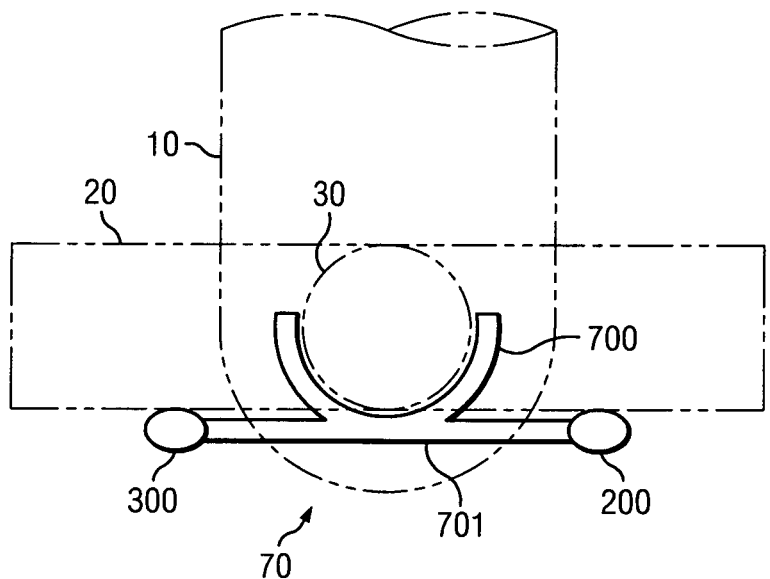
FIG. 16B is an end view of a preferred embodiment engaged with a bushing and a pedal.

Referring to FIGS. 15, 16A, and 16B, positioner 70 is engaged with bushing 30 and positioning pedal 20 in a generally horizontal position. FIGS. 15 and 16A depict the pedal at a top dead center position. FIG. 16B depicts the pedal at a bottom dead center position. Positioner 70 comprises flexible clamp 700, prong bridge 701, prong 200, and prong 300. Flexible clamp 700 is frictionally positioned on bushing 30 allowing prong 200 and prong 300 to extend from prong bridge 701 in a generally horizontal direction to locate pedal 20 in a generally horizontal position. In use, force 950 is applied to top surface 22 of pedal 20, and forces 951 and 954 are applied to prongs 200 and 300.

Flexible clamp 700 is constructed of a material which allows plastic deformation. Flexible clamp 700 is flexibly deformed to be positioned on bushing 30. Upon returning to original shape, flexible clamp 700 releasably grips bushing 30. Those skilled in the art will appreciate that flexible clamp 700 can assume a multitude of shapes to suitably grip bushing 30.

Each of the embodiments disclosed can be construction of plastic or any suitable material through any suitable manufacturing technique. In one embodiment, the material chosen will allow prong 200 and/or prong 300 to be fractured and discarded after use. In these embodiments, the material should be more brittle. In another embodiment, the material chosen will allow prong 200 and prong 300 to bend, but not break, allowing the positioner to be reused. In these embodiments, the material should be more flexible. The positioner can also be made of a material that is disposable, biodegradable, and/or compostable. Examples are cardboard or a biomass plastic (such as cornstarch).

Figure 13:
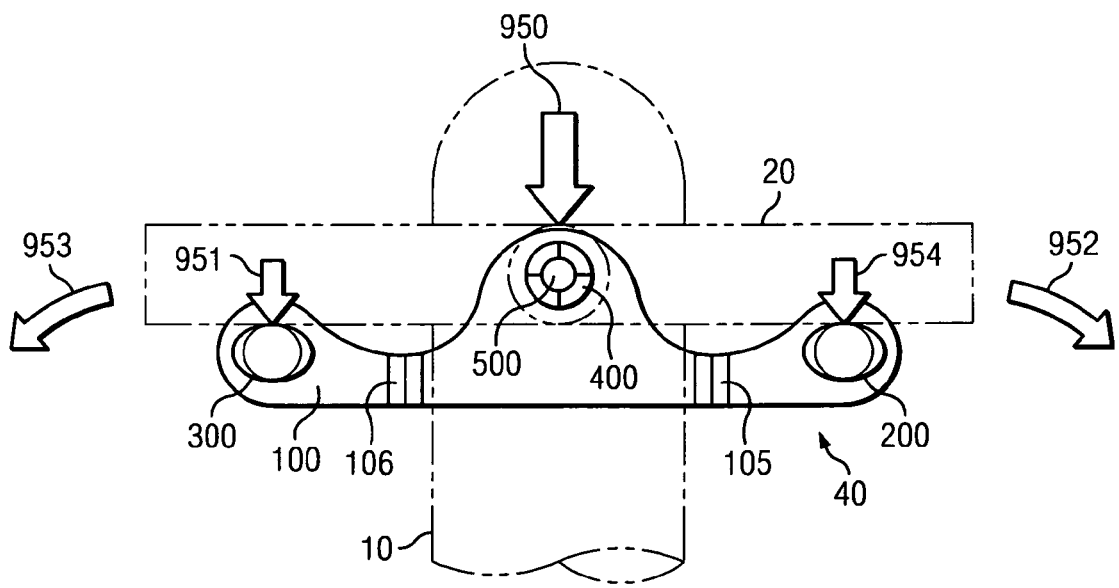
FIG. 13 is an end view of a preferred embodiment engaged with a crank arm and a pedal.

Referring to FIG. 13 in use, the positioner is placed into a position whereby at least one prong engages a pedal, thereby fixing a pedal in a generally horizontal position. If force 950 is added to pedal 20 sufficient to rotate crank arm 10 in direction 952 or direction 953, pedal 20 rotates about an axis that is generally perpendicular to crank arm 10. The rotation of pedal 20 applies shear force 951 or 954, respectively, on prong 200, thereby severing prongs 200 or 300 at notch 105 or 106, respectively. The widths of prong 200 and prong 300 are sufficient to allow shear forces 951 and 954 to sever prong 200 and prong 300.

Referring to FIGS. 12A and 12B in use, the positioner is placed into a holding position whereby at least one prong engages the pedal holding the pedal in a generally horizontal position. A user applies force 950 on pedal 20 sufficient to rotate crank arm 10 in direction 952 or direction 953. Pedal 20 rotates about an axis generally perpendicular to crank arm 10. Pedal 20 rotating about the axis generally perpendicular to crank arm 10 applies shear force 951 or 954, respectively, on prong 200, bending it, but not severing it. As crank arm 10 continues to rotate, shear force 951 or 954 causes the positioner to bend causing the positioner to disengage from and fall from crank arm 10.

Referring to FIG. 16A in use, the positioner is placed into a position whereby at least one prong engages a pedal, thereby fixing a pedal in a generally horizontal position. If force 950 is added to pedal 20 sufficient to rotate crank arm 10 in direction 952 or direction 953, pedal 20 rotates about an axis that is generally perpendicular to crank arm 10. The rotation of pedal 20 applies shear force 951 or 954, respectively, on prong 200, thereby severing prongs 200 or 300. The widths of prong 200 and prong 300 are sufficient to allow shear forces 951 and 954 to sever prong 200 and prong 300.

In another embodiment, the positioner is placed into a holding position whereby at least one prong engages the pedal holding the pedal in a generally horizontal position. A user applies force 950 on pedal 20 sufficient to rotate crank arm 10 in direction 952 or direction 953. Pedal 20 rotates about an axis generally perpendicular to crank arm 10. Pedal 20 rotating about the axis generally perpendicular to crank arm 10 applies shear force 951 or 954, respectively, on prong 200, bending it, but not severing it. As crank arm 10 continues to rotate, shear force 951 or 954 causes the positioner to bend causing the positioner to disengage from and fall from crank arm 10.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A positioner for positioning a pedal attached to a crank arm comprising:
    a bridge;
    a mounting post extends perpendicularly from the bridge and engages a hole fixed with respect to the crank arm;
    at least one prong attached to the bridge, adjacent the pedal;
    wherein the mounting post has a frustoconical shape with an outside surface and an inside surface forming a central hole, and at least one multifurcated section.

2. The positioner of claim 1, further comprising:
    a pin residing in the central hole urging against the inside surface thereby expanding the at least one multifurcated section to frictionally engage the hole.

3. The positioner of claim 1, wherein the bridge has a break-away notch adjacent the at least one prong.

* * * * *